United States Patent
Baskar et al.

(10) Patent No.: US 11,558,733 B2
(45) Date of Patent: Jan. 17, 2023

(54) MANAGING SUB-FLOW COMMUNICATIONS IN USER EQUIPMENT

(71) Applicant: Samsung Electronics Co., Ltd., Suwon-si (KR)

(72) Inventors: Umasankar Ceendhralu Baskar, Bangalore (IN); Sanjeevi Reddy G V M, Bengaluru (IN); Thejeswara Reddy Pocha, Bengaluru (IN); Praveen Chebolu, Bangalore (IN); Venkata Raju Indukuri, Bengaluru (IN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 87 days.

(21) Appl. No.: 16/556,992

(22) Filed: Aug. 30, 2019

(65) Prior Publication Data
US 2021/0014666 A1 Jan. 14, 2021

(30) Foreign Application Priority Data
Jul. 10, 2019 (IN) .............................. 201941027645

(51) Int. Cl.
*H04W 8/18* (2009.01)
*H04W 28/12* (2009.01)
(Continued)

(52) U.S. Cl.
CPC ........... *H04W 8/183* (2013.01); *H04L 5/0055* (2013.01); *H04W 28/12* (2013.01);
(Continued)

(58) Field of Classification Search
None
See application file for complete search history.

(56) References Cited

U.S. PATENT DOCUMENTS 10,143,001 B2 * 11/2018 Schliwa-Bertling ........................ H04W 76/18
2012/0144062 A1 6/2012 Livet et al.
(Continued)

FOREIGN PATENT DOCUMENTS

| WO | WO-2012106032 A1 * | 8/2012 | ........... H04L 47/193 |
| WO | WO-2016/101171 A1 | 6/2016 | |
| WO | WO-2016/108150 A1 | 7/2016 | |

OTHER PUBLICATIONS

Kultida Rojviboonchai et al., "An Evaluation of Multi-path Transmission Control Protocol (M/TCP) with Robust Acknowledgement Schemes", Sep. 1, 2004, IEICE transactions on communications, vol. 87, No. 9, p. 2699-2707.

(Continued)

*Primary Examiner* — Alpus Hsu
*Assistant Examiner* — Camquyen Thai
(74) *Attorney, Agent, or Firm* — Harness, Dickey & Pierce, P.L.C.

(57) ABSTRACT

A method performed by a User Equipment (UE) for managing sub-flow communications is provided, the method includes selecting a sub-flow among a plurality of sub-flows of the UE based on a set of parameters associated with each of the plurality of sub-flows, and transmitting a plurality of Transmission Control Protocol (TCP) acknowledgement messages in a single frame through the selected sub-flow, the plurality of TCP acknowledgement messages being associated with the plurality of sub-flows.

20 Claims, 6 Drawing Sheets

(51) Int. Cl.
*H04W 52/36* (2009.01)
*H04L 5/00* (2006.01)
*H04W 52/14* (2009.01)
*H04W 80/06* (2009.01)

(52) U.S. Cl.
CPC ....... *H04W 52/146* (2013.01); *H04W 52/365* (2013.01); *H04W 80/06* (2013.01)

(56) References Cited

U.S. PATENT DOCUMENTS

| | | | | |
|---|---|---|---|---|
| 2012/0226802 | A1* | 9/2012 | Wu | H04L 1/1887 709/224 |
| 2013/0064105 | A1* | 3/2013 | Huang | H04L 65/80 370/252 |
| 2014/0269289 | A1* | 9/2014 | Effros | H04L 47/193 370/231 |
| 2015/0327207 | A1 | 11/2015 | Bharadwaj | |
| 2015/0365940 | A1* | 12/2015 | Chu | H04W 74/02 370/329 |
| 2016/0134519 | A1* | 5/2016 | Ouedraogo | H04L 45/24 709/219 |
| 2016/0183129 | A1* | 6/2016 | Liu | H04W 76/15 370/331 |
| 2017/0005705 | A1* | 1/2017 | Casselman | H04L 5/0032 |
| 2017/0048074 | A1 | 2/2017 | Roeland | |
| 2017/0104717 | A1 | 4/2017 | Vesterinen et al. | |
| 2017/0188407 | A1* | 6/2017 | Zee | H04W 36/0027 |
| 2017/0223148 | A1 | 8/2017 | Roeland et al. | |
| 2018/0041415 | A1* | 2/2018 | Nitinawarat | H04W 68/02 |
| 2018/0084597 | A1* | 3/2018 | Kanagarathinam | H04W 76/15 |
| 2018/0132289 | A1 | 5/2018 | Zhao et al. | |
| 2018/0234335 | A1* | 8/2018 | Sridhar | H04L 69/163 |
| 2019/0274068 | A1* | 9/2019 | Bhartia | H04L 47/40 |

OTHER PUBLICATIONS

Ford et al., "TCP Extensions for Multipath Operation with Multiple Addresses", Jan. 2013, Internet Engineering Task Force (IETF), RFC 6824 (https://tools.ietf.org/html/rfc6824).
Bonaventure, et al., "Multipath TCP Deployments", Nov. 1, 2016, IETF Journal (https://www.ietfjournal.org/multipath-tcp-deployments/).
Singh et al., "Multipath RTP (MPRTP) draft-singh-avtcore-mprtp-10", Nov. 14, 2014, AVT Core Working Group (https://tools.ietf.org/html/draft-singh-avtcore-mprtp-10/).
"What is the meaning of Dual Standby phone(GT-S6102)", Aug. 9, 2018, Samsung (https://www.samsung.com/in/support/mobile-devices/what-is-the-meaning-of-dual-standby-phone/).
Bonaventure, et al., "Multipath TCP Deployments", Nov. 1, 2016, IETF Journal, (https://www.ietfjournal.org/multipath-tcp-deployments/) p. 1-8.

* cited by examiner

MANAGING SUB-FLOW COMMUNICATIONS IN USER EQUIPMENT

CROSS-REFERENCE TO RELATED APPLICATION

This application claims priority under 35 U.S.C. § 119 to Indian Patent Application No. 201941027645 filed on Jul. 10, 2019, in the Indian Intellectual Property Office, the disclosure of which is incorporated by reference herein in its entirety.

FIELD OF THE INVENTION

The present disclosure in general relates to managing sub-flow communications in User Equipment (UEs) and, in particular, relates to improving downlink throughput in UEs.

BACKGROUND

Multipath Transmission Control Protocol TCP (MPTCP) provides mechanism to receive and/or transmit data on multiple paths and/or sub-flows simultaneously or contemporaneously, with each path and/or sub-flow being assigned with one Internet Protocol (IP) address. Present mobile devices contain more than one communication entity (e.g., wireless communication method) such as cellular communication ($2^{nd}$ Generation (2G)/$3^{rd}$ Generation (3G)/Long-Term Evolution (LTE)) and/or WiFi. In order to utilize mobile device resources (e.g., power resources) efficiently and/or increase communication bandwidth, mobile devices contemporaneously establish connections with two IP addresses, one with cellular communication and other with WiFi (e.g., multiple paths and/or sub-flows), using MPTCP. Benefits of contemporaneous communication with two IP addresses using MPTCP include better resource utilization, higher throughput, and/or faster handovers in delay sensitive applications.

Upon establishment of multiple sub-flows by a mobile device, downlink data packets are received on (e.g., over) each of the sub-flows. The mobile device transmits a Transmission Control Protocol (TCP) acknowledgement (ack) message in response to receiving each of such downlink data packets. The TCP ack message transmitted in response to a particular downlink data packet is transmitted over the same sub-flow over which the particular downlink data packet was received. Thus, as may be understood, time scheduling and/or transmitter arbitration is performed at the mobile device to coordinate the TCP ack transmissions over the different sub-flows. It is only after the transmission of such TCP ack messages, that subsequent downlink data packets are received. As a result, the downlink throughput associated with the different sub-flows may be reduced if the time scheduling and/or transmitter arbitration of the TCP ack messages is inefficient.

Thus, a solution that overcomes the above deficiencies would be desirable.

SUMMARY

This summary is provided to introduce a selection of concepts, in a simplified format, that are further described in the detailed description of the invention. This summary is neither intended to identify key or essential inventive concepts of the invention and nor is it intended for limiting the scope of the invention.

In an example embodiment, a method performed by a User Equipment (UE) for managing sub-flow communications is provided. The method includes selecting a sub-flow among a plurality of sub-flows of the UE based on a set of parameters associated with each of the plurality of sub-flows, and transmitting a plurality of Transmission Control Protocol (TCP) acknowledgement messages in a single frame through the selected sub-flow, the plurality of TCP acknowledgement messages being associated with the plurality of sub-flows.

In an example embodiment, a User Equipment (UE) configured to manage sub-flow communications is provided. The UE includes at least one processor configured to execute computer-readable instructions to select a sub-flow among a plurality of sub-flows of the UE based on a set of parameters associated with each of the plurality of sub-flows, and transmit a plurality of Transmission Control Protocol (TCP) acknowledgement messages in a single frame through the selected sub-flow, the plurality of TCP acknowledgement messages being associated with the plurality of sub-flows.

To further clarify advantages and features of the present invention, a more particular description of the invention will be rendered by reference to some example embodiments thereof, which is illustrated in the appended drawings. It is appreciated that these drawings depict only some example embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Further, skilled artisans will appreciate that elements in the drawings are illustrated for simplicity and may not have been necessarily been drawn to scale. For example, the flow charts illustrate the method in terms of the most prominent operations involved to help to improve understanding of aspects of the present invention. Furthermore, in terms of the construction of the device, one or more components of the device may have been represented in the drawings by conventional symbols, and the drawings may show only those specific details that are pertinent to understanding the example embodiments of the present invention so as not to obscure the drawings with details that will be readily apparent to those of ordinary skill in the art having benefit of the description herein.

DETAILED DESCRIPTION

For the purpose of promoting an understanding of the principles of the invention, reference will now be made to some example embodiments illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with some example embodiments is included in at least one example embodiment of the present invention. Thus, appearances of the phrase "in an example embodiment", "in at least one example embodiment" and similar language throughout this specification may, but do not necessarily, all refer to the same example embodiment.

The terms "comprises", "comprising", or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

Example embodiments of the present invention will be described below in detail with reference to the accompanying drawings.

Figure 1:
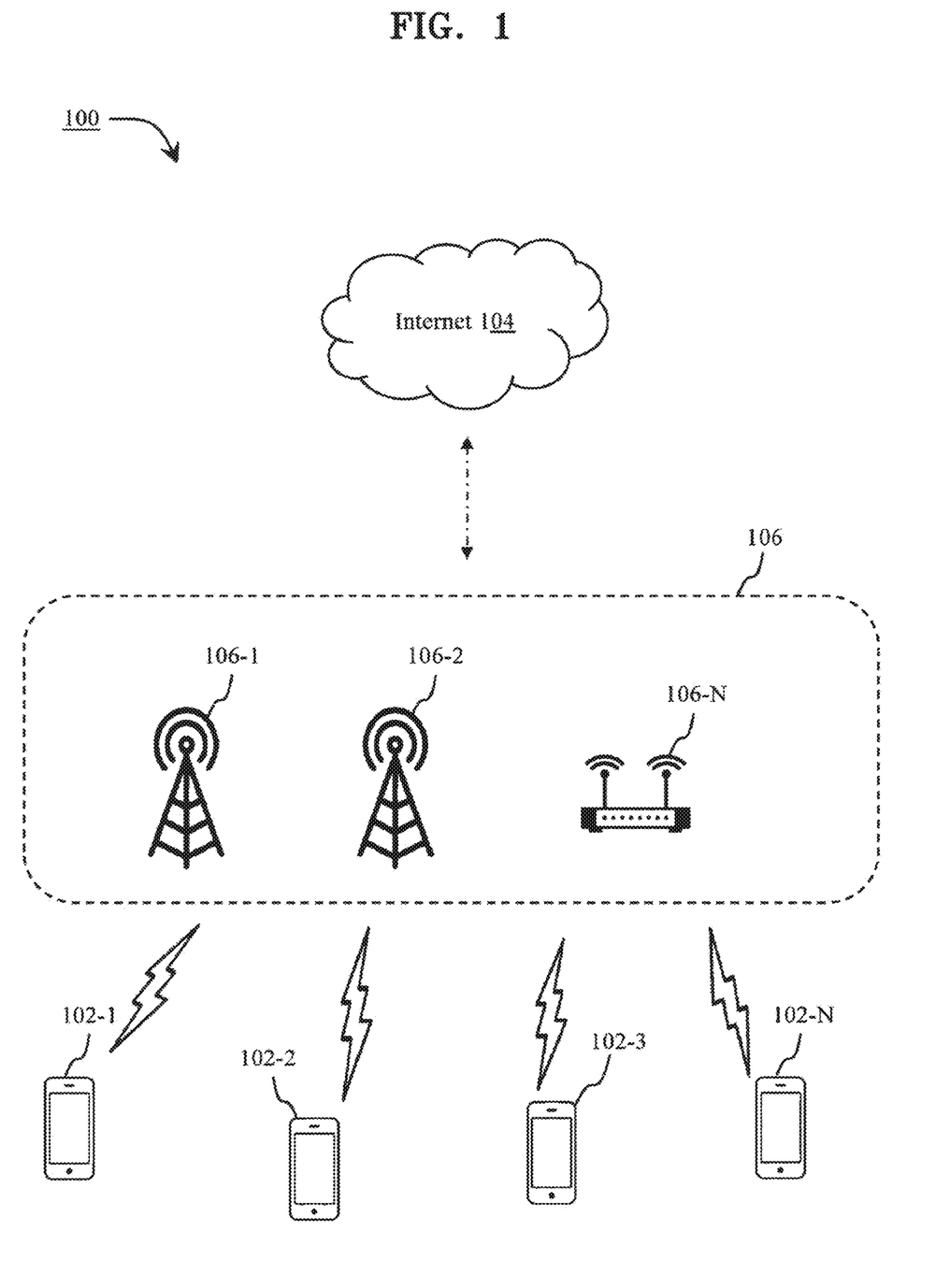
FIG. 1 illustrates a network environment including at least one UE, according to an example embodiment of the present disclosure.

FIG. 1 illustrates a network environment 100 including at least one User Equipment (UE) 102, according to an example embodiment of the present disclosure. In an example, the network environment 100 includes a plurality of UEs 102-1, 102-2, 102-3, . . . , 102-N. The plurality of UEs 102-1, 102-2, 102-3, . . . , 102-N, hereinafter, may collectively be referred to as the UEs 102, and individually be referred to as the UE 102. Examples of the UE 102 may include, but are not limited to, a smartphone, a tablet, a laptop, a Personal Digital Assistant (PDA), a desktop computer, and/or the like. Furthermore, the UE 102 may be a Dual Receiver Dual Subscriber Identity Module (SIM) Dual Standby (DR-DSDS) equipment (e.g., device) having a single transmitter and two receivers, where the UE 102 is configured to support two Subscriber Identity Modules (SIMs). Furthermore, the UE 102 may be a Dual SIM Dual Active (DSDA) equipment (e.g., device) having two transceivers, where the UE 102 is configured to support two SIMs. Furthermore, the UE 102 may be one of a Single SIM Dual Radio (SSDR) equipment (e.g., device) and/or a Single SIM Multiple Radio (SSMR) equipment (e.g., device).

In an example, the UEs 102 may be connected to the Internet 104 through one or more of a plurality of Radio Access Technologies (RATs) 106-1, 106-2, . . . 106-N. The plurality of RATs 106-1, 106-2, . . . , and 106-N, hereinafter, may collectively be referred to as the RATs 106, and individually be referred to as the RAT 106.

In an example, one or more of the RATs 106 may operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, one or more of the RATs 106 may employ other types of cellular networks, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks may be fifth generation (5G) or beyond cellular networks. Furthermore, in an example, the RATs 106 may be a combination of one or more networks of the aforementioned type. Besides providing other capabilities to the UEs 102, the RATs 106 facilitate the UEs 102 to connect to the Internet 104 (e.g., the UEs 102 may access the Internet 104 via the RATs 106). Furthermore, in an example, the RATs 106 may include architecture and devices that support technologies, such as Asymmetric digital subscriber line (ADSL) broadband, cable broadband, fibre broadband, and/or the like, that provide fixed internet connection, e.g., internet at a fixed geographic location. As may be understood, the UEs 102 may connect to the Internet using such technologies either using wired technology, for example, Ethernet, and/or wireless technology, such as Wi-Fi.

In an example, the UE 102 may be registered with one or more service providers providing access to the Internet 104. As may be understood, the service providers may implement one or more of the RATs 106 to provide the UEs 102 with access to the Internet 104. In an example, the UE 102 may include a Subscriber Identification Module (SIM) registered with a service provider of a cellular network. Further, the UE 102 may also be registered with a broadband service provider. In said example, the UE 102 may access the Internet 104 through either of the cellular network or the broadband. In another example, the UE 102 may include Dual SIMs and may connect to the Internet 104 through a cellular network of either of the Dual SIMs, or through the broadband.

Furthermore, in an example, the UE 102 may support Multipath Transmission Control Protocol (TCP), (MPTCP). Thus, the UE 102 may establish multiple paths, and/or sub-flows to the Internet 104 for accessing data related to a service. For example, the UE 102 may stream a video hosted on a server on the Internet 104. In said example, by virtue of MPTCP, the UE 102 may establish multiple sub-flows to the server for receiving data related to the video.

In an example, a UE 102 has established a plurality of sub-flows and is receiving downlink data packets on each of the plurality of sub-flows. As may be understood, the UE 102 is configured to transmit a TCP acknowledgement (ack) message in response to each of the downlink data packets received. Conventionally, such TCP ack messages are transmitted over the same sub-flow or a similar sub-flow to the sub-flow over which the corresponding downlink data packet was received.

According to an example embodiment of the present disclosure, the UE 102 is configured to transmit the plurality of TCP ack messages through a single sub-flow. Transmission of the TCP ack messages through a single sub-flow provides for increase in downlink throughput, as will be described below. In an example embodiment, the sub-flow through which the plurality of TCP ack messages is to be transmitted is selected based on a set of parameters associated with each of the plurality of sub-flows. The set of parameters may include at least one of a radio connection quality associated with a sub-flow, an Uplink Power Headroom (UPH) associated with a sub-flow, and/or a charging policy of a carrier of a sub-flow. In an example embodiment, at first, a parameter may be selected and subsequently, a comparison (e.g., determination) between the values of the parameter, for each of the sub-flows may be done. Based on the comparison, a sub-flow is then selected. As an example, a sub-flow with the lowest tariff may be selected.

After the sub-flow is selected, the UE 102 is configured to transmit the plurality of TCP ack messages in respect of (e.g., in response to) a plurality of downlink data packets received on one or more other sub-flows of the plurality of sub-flows, through the selected sub-flow. In an example embodiment, the plurality of TCP ack messages may be transmitted along with a TCP ack message of the selected sub-flow in a single frame.

Conventional UEs transmit each TCP ack message over the same sub-flow or a similar sub-flow to the sub-flow over which the corresponding downlink packet was received. A subsequent downlink packet may only be received after the UE transmits a TCP ack message corresponding to a previous downlink packet. The conventional UEs perform time scheduling and transmitter arbitration to coordinate the transmission of the TCP ack messages over the various sub-flows. As a result, TCP ack message transmission is delayed, downlink throughput of the sub-flows is reduced, and excessive resources are consumed (e.g., processor, memory, bandwidth, power and/or fees) as TCP ack message transmission is coordinated over the various sub-flows, including less desirable sub-flows. However, according to some example embodiments, the transmission of all the TCP ack messages may occur through the selected sub-flow, and in a single frame. Thus, subsequent frames that were to be utilized for sending the plurality of TCP ack messages, become available for reception of downlink data packets. As a result, TCP ack message transmission delay is reduced, the downlink throughput of the data connection is increased and resource consumption (e.g., processor, memory and/or bandwidth) is reduced. Furthermore, a most and/or more desirable carrier (e.g., the carrier and/or sub-flow having the highest radio connection quality, most Uplink Power Headroom, and/or most least expensive charging policy) is selected for transmission of the TCP ack messages, TCP ack message transmission delay is further reduced and resource consumption (e.g., processor, memory, bandwidth, power and/or fees) is reduced.

Figure 2:
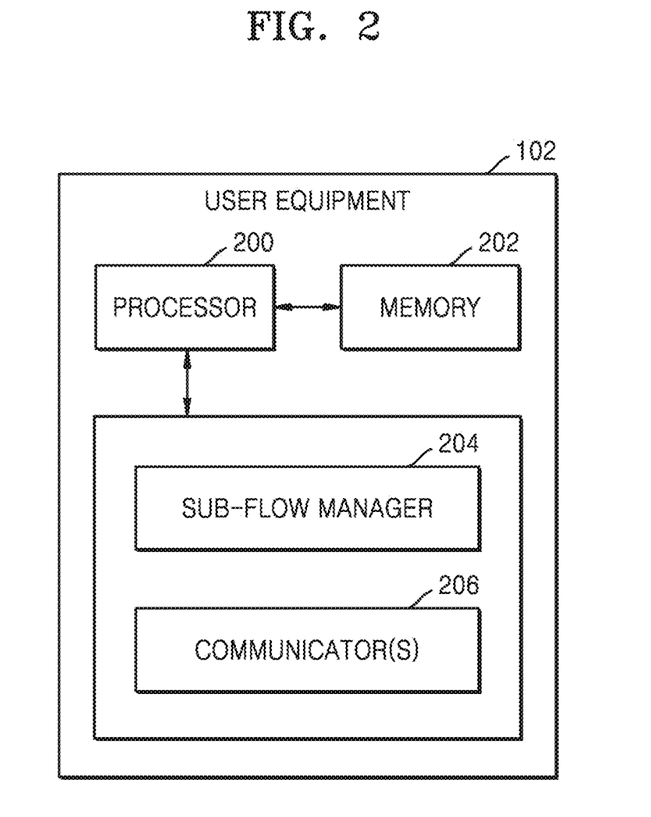
FIG. 2 illustrates a schematic block diagram of the UE, according to an example embodiment of the present disclosure.

FIG. 2 illustrates a schematic block diagram of the UE 102, according to an example embodiment of the present disclosure. In an example, the UE 102 includes at least one processor 200 (also referred to herein as "the processor 200"), memory 202, a sub-flow manager 204, and/or a communicator 206. The processor 200 may be a single processing unit or a plurality of processing units, all of which could include multiple computing units (e.g., processor cores). The processor 200 may be implemented as one or more microprocessors, microcomputers, microcontrollers, digital signal processors, central processing units, graphical processing units, neural processing units, state machines, logic circuitries, and/or any devices that manipulate signals and/or data based on operational instructions. Among other capabilities, the processor 200 is configured to fetch and execute computer-readable instructions and data stored in the memory 202. According to some example embodiments, operations described herein as being performed by UE 102 may be performed by at least one processor (e.g., the processor 200) executing program code that includes instructions corresponding to the operations. The instructions may be stored in a memory of the UE 102 (e.g., the memory 202). The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA).

The memory 202 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM, flash memories, hard disks, optical disks, and/or magnetic tapes.

In an example, the sub-flow manager 204, amongst other things, may include one or more routines, programs, objects, components, data structures, etc., which may be used to perform particular tasks and/or implement data types. The sub-flow manager 204 may also be implemented as one or more signal processor(s), state machine(s), logic circuitries, and/or any other device and/or component that may manipulate signals and/or data based on operational instructions. Further, the sub-flow manager 204 may be implemented in hardware, instructions executed by a processing unit, or by a combination thereof. The processing unit may comprise a computer, a processor, such as the processor 200, a state machine, a logic array and/or any other suitable device(s) capable of processing computer-readable instructions. The processing unit may be a general-purpose processor which may execute computer-readable instructions to cause the general-purpose processor to perform any or all of the operations described herein as being performed by the sub-flow manager 204. The processing unit may be dedicated (e.g., a special-purpose processor) which may execute computer-readable instructions to cause the dedicated processing unit to perform any or all of the operations described herein as being performed by the sub-flow manager 204. In another aspect of the present disclosure, the sub-flow manager 204 may be machine-readable instructions (software) which, when executed by a processor/processing unit (e.g., processor 200), may cause the processor/processing unit to perform any or all of the operations described herein as being performed by the sub-flow manager 204. In an example, the sub-flow manager 204 may be coupled to the processor 200.

The communicator 206, in an example, may include one or more of a transmitter(s), a receiver(s), a transceiver(s), a Wireless Network Interface Card(s) (WNIC), and/or a Wireless Wide Area Network Card(s) (WWANC). The communicator 206 may support various communication technologies, such as cellular technologies (e.g., any of the radio access technologies discussed above as being supported and/or used by the RATs 106), Wi-Fi technology, and/or short range communication technologies (e.g., Bluetooth). As may be gathered, a plurality of the communicators 206 may be used for establishing multiple sub-flows related to one or more data connections. The data processed, received, and/or generated by one or more of the processor 200 and/or the sub-flow manager 204 may be stored in the memory 202.

In an example embodiment, the UE 102 may have a plurality of sub-flows established in respect of a data connection. For example, the sub-flow manager 204 may establish a first sub-flow, and may establish a second sub-flow after the first sub-flow has been established upon (e.g., in response to) determining at least one condition from a first set of conditions is and/or has been satisfied. The first set of conditions may include receipt of a user input to establish the second sub-flow (e.g., a second sub-flow establishment input from an external source). The first set of conditions may further include a radio connection quality (e.g., a signal-to-noise ratio) of the first sub-flow falling and/or being below a defined threshold. Furthermore, the first set of conditions may include a charging policy of the second sub-flow having a tariff lower than a tariff of a charging policy of the first sub-flow. In response to determining any one of the first set of conditions has been satisfied, the sub-flow manager 204 may establish the second sub-flow. According to some example embodiments, the sub-flow manager 204 may use one or more of any known methods to determine the radio connection quality and/or the charging policies of the first and second sub-flows. Thus, the sub-flow manager 204 may establish the plurality of sub-flows including the first sub-flow and the second sub-flow. As may be gathered, the communicator 206 may include a plurality of communicators 206, and one sub-flow may be established using one communicator 206 from the plurality of communicators 206.

Upon establishment of the plurality of sub-flows, downlink data packets on each of the plurality of sub-flows may be received by one or more communicators 206. As may be understood, the UE 102 may be configured to transmit a TCP ack message in response to each of the downlink data packets received by the one or more communicators 206. According to an example embodiment, the UE 102 may be configured to transmit the plurality of TCP ack messages in a single frame through a single sub-flow.

In operation, the sub-flow manager 204 may be configured to select the sub-flow through which the plurality of TCP ack messages is to be transmitted. For example, the sub-flow manager 204 may be configured to select the sub-flow from amongst the plurality of sub-flows based on a set of parameters associated with each respective sub-flow of the plurality of sub-flows. The set of parameters comprises at least one of a radio connection quality associated with the respective sub-flow, an Uplink Power Headroom (UPH) associated with the respective sub-flow, and the charging policy of a carrier of the respective sub-flow. According to some example embodiments, the sub-flow manager 204 may use one or more of any known methods to determine the radio connection quality, the UPH and/or the charging policies of the carrier. In an example, the sub-flow manager 204 may select at least one parameter from the set of parameters and subsequently, may compare the value of the at least one parameter associated with each of the sub-flows (e.g., the sub-flow manager 204 may determine which of the sub-flows has a most or more desirable value of the parameter). Accordingly, based on the comparison, the sub-flow manager 204 may select a sub-flow.

By way of example, consider a case where the sub-flow manager 204 has established three sub-flows: sub-flow 1, sub-flow 2, and sub-flow 3. Here, sub-flow 1 may be a sub-flow established using 3G technology, sub-flow 2 may be a sub-flow established using 4G technology, and sub-flow 3 may be a sub-flow established using Wi-Fi. Table 1 illustrating the three sub-flows along with the values of parameters associated with each of them is provided below.

TABLE 1

| Sub-Flow | Radio Connection Quality | UPH | Charging Tariff |
|---|---|---|---|
| Sub-Flow 1 (3G) | −85 dbm | −10 db | INR 150/pm |
| Sub-Flow 2 (4G) | −90 dbm | −5 db | INR 220/pm |
| Sub-Flow 3 (Wi-Fi) | −80 dbm | −20 db | INR 110/pm |

In the above example, the sub-flow manager 204 may select charging tariff as a parameter and subsequently, may select sub-flow 3 in response to determining sub-flow 3 has the lowest tariff. In an example, the sub-flow manager 204 may dynamically select the parameter based on which the sub-flow is to be selected. In another example, the sub-flow manager 204 may select the parameter based on defined rules stored in the memory 202. For instance, as per one rule, each of the parameters may have an associated weight, and the sub-flow manager 204 may select the parameter based on the corresponding weight of the parameter.

Thus, as explained above, the sub-flow manager 204 may select the sub-flow through which the plurality of TCP ack messages is to be transmitted.

In an example embodiment, sub-flow manager 204 may cause the plurality of TCP ack messages to be transmitted via the one or more communicators 206 through the selected sub-flow in in response to a plurality of downlink data packets received on other sub-flows of the plurality of sub-flows. In an example embodiment, the sub-flow manager 204 may cause the plurality of ack messages to be transmitted along with a TCP ack message of the selected sub-flow via the one or more communicators 206 in a single frame. In an example, a tunneling technique may be implemented for transmitting the plurality of TCP ack messages. Furthermore, as may be understood, the plurality of TCP ack messages may be transmitted through a communicator 206 among the one or more communicators 206 through which the selected sub-flow is established.

In an example embodiment, the sub-flow manager 204 may be configured to release the second sub-flow based on a second set of conditions (e.g., in response to determining that one or more of the second set of conditions is satisfied). The second set of conditions may include a radio connection quality of the second sub-flow being lower than a radio connection quality of the first sub-flow for a determined time period. Further, the second set of conditions may include termination of an application availing (e.g., accessing) data services using the second sub-flow. According to some example embodiments, the sub-flow manager 204 may use one or more of any known methods to determine the radio connection quality of the first and second sub-flows and/or the termination of the application accessing data services using the second sub-flow.

Figure 3:
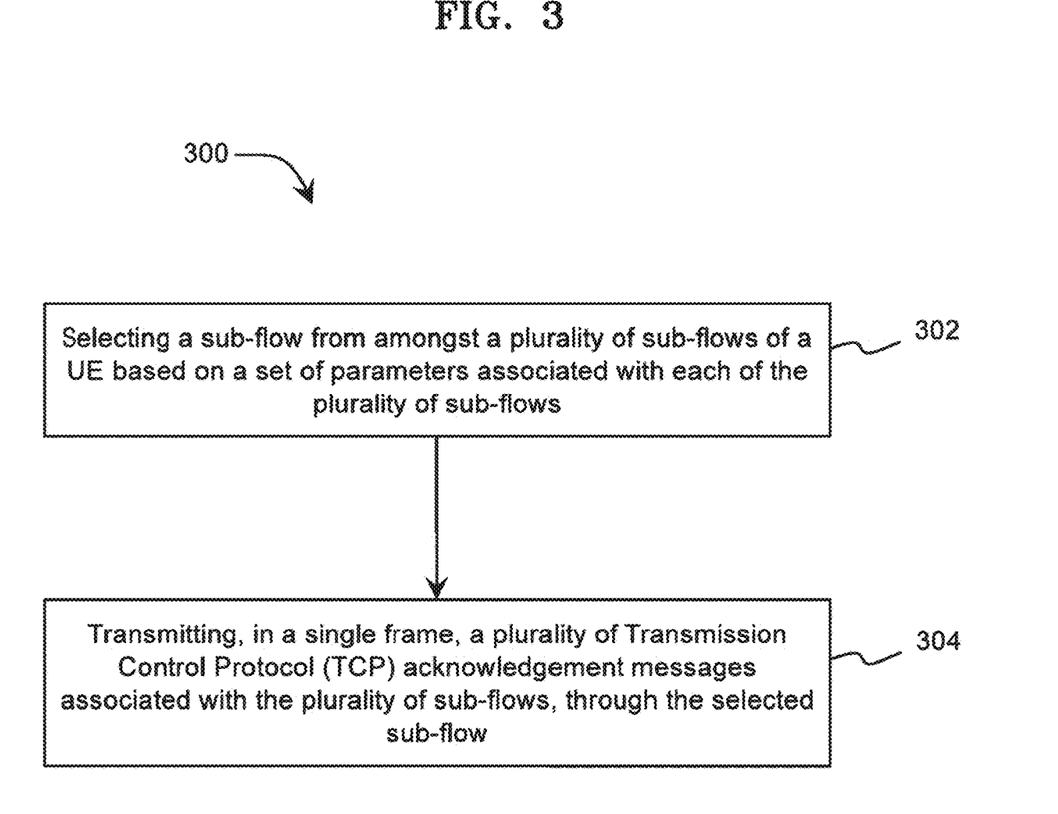
FIG. 3 illustrates a method, according to an example embodiment of the present disclosure.

FIG. 3 illustrates a method 300 of managing sub-flow communications in a UE, according to an example embodiment of the present disclosure. The method 300 may be implemented in the UE 102, using components thereof, as described above. Further, for the sake of brevity, details of the present disclosure that are explained in detail with reference to description of FIGS. 1 and 2 above are not explained in detail with reference to FIG. 3.

At operation 302, a sub-flow from amongst a plurality of sub-flows of a UE is selected based on a set of parameters associated with each of the plurality of sub-flows. In an example, the UE may support MPTCP, and accordingly may have established the plurality of sub-flows. The plurality of sub-flows may be established based on a first set of conditions, as explained above in the description of FIG. 2. In said example, downlink data packets may be received on each of the sub-flows. Accordingly, a TCP ack message is transmitted in respect of each of the downlink data packets.

In an example embodiment, the plurality of TCP ack messages is transmitted through a single sub-flow, selected from the plurality of sub-flows. As mentioned above, the sub-flow is selected based on the set of parameters. The set of parameters may include at least one of a radio connection quality associated with a sub-flow, an Uplink Power Headroom (UPH) associated with a sub-flow, and/or a charging policy of a carrier of a sub-flow.

Examples of the UE may include, but are not limited to, a smartphone, a tablet, a laptop, a Personal Digital Assistant (PDA), a desktop computer, and/or the like. Furthermore, the UE may be a Dual Receiver Dual SIM Dual Standby (DR-DSDS) equipment having a single transmitter and two receivers, where the UE is configured to support two Subscriber Identity Modules (SIMs). Furthermore, the UE may be a Dual SIM Dual Active (DSDA) equipment having two transceivers, where the UE is configured to support two SIMs. Furthermore, the UE may be one of a Single SIM Dual Radio (SSDR) equipment and/or a Single SIM Multiple Radio (SSMR) equipment.

At operation 304, a plurality of TCP ack messages associated with the plurality of sub-flows may be transmitted in a single frame, through the selected sub-flow. In an example embodiment the plurality of TCP ack messages are transmitted along with a TCP ack message of the selected sub-flow in the single frame.

In an example embodiment, the second sub-flow may be released based on a second set of conditions. The second set of conditions may include a radio connection quality of the second sub-flow being lower than a radio connection quality of the first sub-flow for a determined time period. Further, the second set of conditions may include termination of an application availing data services using the second sub-flow.

Figure 4A:
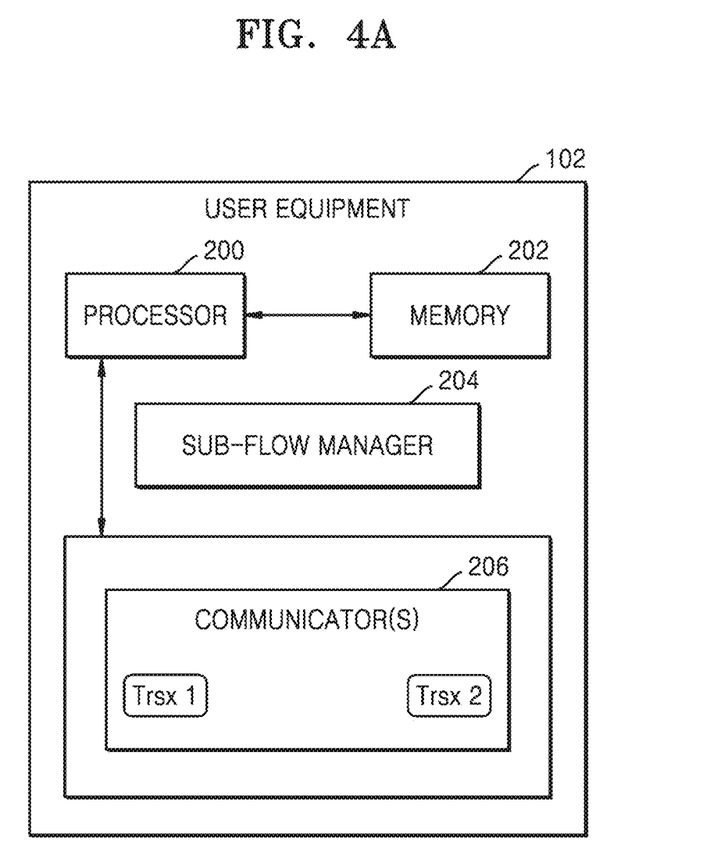
FIGS. 4(a)-(c) illustrate example configurations of the UE, according to an example embodiment of the present disclosure.
Figure 4B:
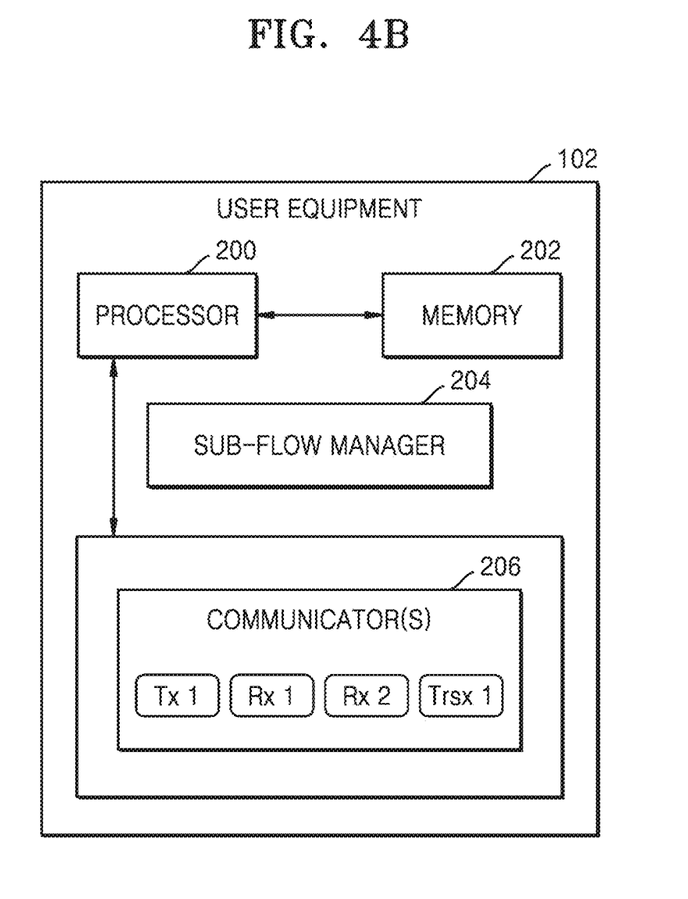
Figure 4C:
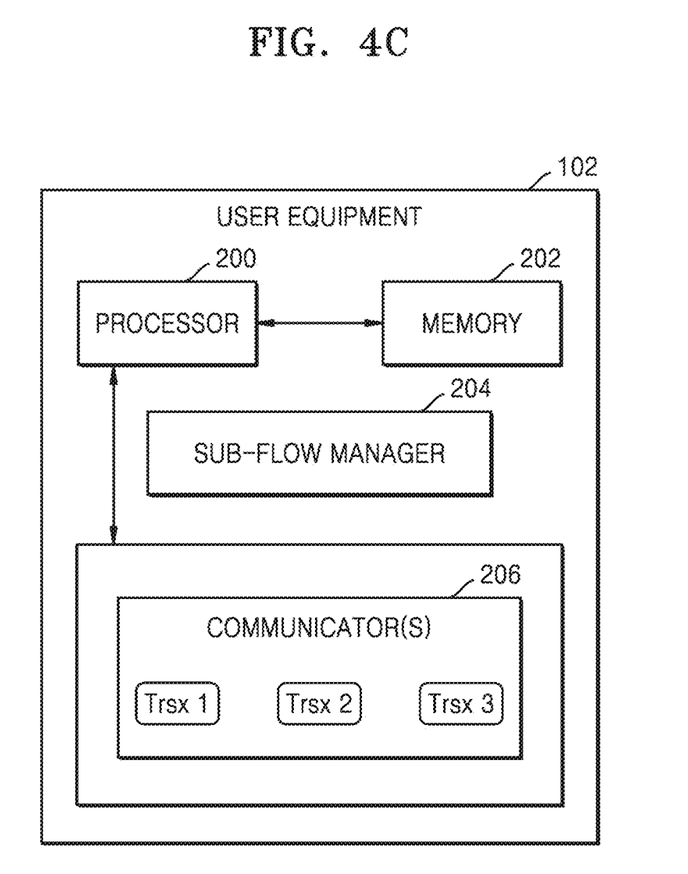

FIGS. 4(a)-4(c) illustrate various example configurations of the UE 102. As shown in the FIGS. 4(a)-4(c), the UE 102 may include the processor 200, the memory 202, and/or the sub-flow manager 204.

Referring to FIG. 4(a), the communicator(s) 206 may include two transceivers, Trsx 1 and Trsx 2. According to some example embodiments, the UE 102 may include a SIM (SIM 1), and may be configured to communicate with a network associated with the SIM via the first transceiver Trsx 1. The UE 102 may also be configured to communicate via Wi-Fi using the second transceiver Trsx 2.

Referring to FIG. 4(b), the communicator(s) 206 may include a transmitter Tx 1, two receivers Rx 1 and Rx 2, and/or a transceiver Trsx 1. For example, the UE 102 may be a DR-DSDS device. According to some example embodiments, the UE 102 may be configured to communicate with a first network associated with a first SIM (SIM 1) via the transmitter Tx 1 and the first receiver Rx 1. The UE 102 may be configured to communicate with a second network associated with a second SIM (SIM 2) via the transmitter Tx 1 and the second receiver Rx 2. The UE 102 may also be configured to communicate via Wi-Fi using the transceiver Trsx 1.

Referring to FIG. 4(c), the communicator(s) 206 may include three transceivers, Trsx 1, Trsx 2, and Trsx 3. For example, the UE 102 may be a DSDA device. According to some example embodiments, the UE 102 may be configured to communicate with a first network associated with a first SIM (SIM 1) via the first transceiver Trsx 1. The UE 102 may be configured to communicate with a second network associated with a second SIM (SIM 2) via the second transceiver Trsx 2. The UE 102 may also be configured to communicate via Wi-Fi using the third transceiver Trsx 3.

According to some example embodiments, the UE 102 may be configured to communicate with a first network associated with a first SIM (SIM 1) via the first transceiver Trsx 1. The UE 102 may be configured to communicate with a second network associated with the first SIM (SIM 1) via the second transceiver Trsx 2. The UE 102 may also be configured to communicate via Wi-Fi using the third transceiver Trsx 3.

In each of the above example configurations, the UE 102 may be configured to operate as described above in the description of FIGS. 1, 2, and 3.

While specific language has been used to describe the present disclosure, any limitations arising on account thereto, are not intended. As would be apparent to a person in the art, various working modifications may be made to the method in order to implement the inventive concepts as taught herein. The drawings and the foregoing description give examples of some example embodiments. Those skilled in the art will appreciate that one or more of the described elements may well be combined into a single functional element. Alternatively, certain elements may be split into multiple functional elements. Elements from one example embodiment may be added to another example embodiment.

We claim:

1. A method performed by a User Equipment (UE) for managing sub-flow communications, wherein the method comprises:
    determining a respective value of at least one parameter associated with each of a plurality of sub-flows of the UE, the at least one parameter being selected from among a set of parameters, the plurality of sub-flows being established according to Multipath Transmission Control Protocol (MPTCP), and the set of parameters including a radio connection quality associated with a respective sub-flow among the plurality of sub-flows, an Uplink Power Headroom (UPH) associated with the respective sub-flow and a charging policy of a carrier of the respective sub-flow;
    selecting a sub-flow among the plurality of sub-flows transmitting a plurality of TCP acknowledgement messages in a single frame, the selecting the sub-flow being based on the respective value of the at least one parameter associated with each of the plurality of sub-flows, and each of the plurality of sub-flows corresponding to a different Internet Protocol (IP) address; and
    transmitting the plurality of TCP acknowledgement messages in the single frame through the selected sub-flow in response to the selecting, each of the plurality of TCP acknowledgement messages being in response to a different downlink data packet among a plurality of downlink data packets, and each of the plurality of downlink data packets being received over a different sub-flow among the plurality of sub-flows.

2. The method as claimed in claim 1, wherein each sub-flow in the plurality of sub-flows is based on a radio access technology, and the radio access technology is one of a cellular communication technology, a Wi-Fi Technology, or a short range communication technology.

3. The method as claimed in claim 1, wherein the UE is one of:
- a Dual Receiver Dual Subscriber Identity Module (SIM) Dual Standby (DR-DSDS) device having a single transmitter and two receivers, and configured to support two SIMs),
- a Dual SIM Dual Active (DSDA) device having two transceivers and configured to support two SIMs,
- a Single SIM Dual Radio (SSDR) device, or
- a Single SIM Multiple Radio (SSMR) device.

4. The method as claimed in claim 1, wherein the method further comprises:
- establishing a second sub-flow among the plurality of sub-flows upon satisfaction of at least one condition from a first set of conditions, the establishing the second sub-flow being performed after a first sub-flow among the plurality of sub-flows has been established.

5. The method as claimed in claim 4, wherein the first set of conditions comprises at least one of:
- receipt of a second sub-flow establishment input from an external source,
- a radio connection quality of the first sub-flow being below a defined threshold, or
- a charging policy of the second sub-flow having tariff lower than a tariff of a charging policy of the first sub-flow.

6. The method as claimed in claim 4, wherein the method further comprises:
- releasing the second sub-flow based on a second set of conditions, wherein the second set of conditions comprises at least one of:
  - a radio connection quality of the second sub-flow being lower than a radio connection quality of the first sub-flow for a determined time period, or
  - termination of an application accessing data services using the second sub-flow.

7. The method as claimed in claim 1, wherein
the at least one parameter includes the radio connection quality; and
the selecting selects a sub-flow having a highest radio connection quality from among the plurality of sub-flows.

8. The method as claimed in claim 1, wherein
the at least one parameter includes the UPH; and
the selecting selects a sub-flow having a highest UPH from among the plurality of sub-flows.

9. The method as claimed in claim 1, wherein
the at least one parameter includes the charging policy; and
the selecting selects a sub-flow having a least expensive charging policy from among the plurality of sub-flows.

10. A User Equipment (UE) configured to manage sub-flow communications, the UE comprising:
at least one processor configured to execute computer-readable instructions to
  determine a respective value of at least one parameter associated with each of a plurality of sub-flows of the UE, the at least one parameter being selected from among a set of parameters, the plurality of sub-flows being established according to Multipath Transmission Control Protocol (MPTCP), and the set of parameters including a radio connection quality associated with a respective sub-flow among the plurality of sub-flows, an Uplink Power Headroom (UPH) associated with the respective sub-flow and a charging policy of a carrier of the respective sub-flow,
  select a sub-flow among the plurality of sub-flows transmitting a plurality of TCP acknowledgement messages in a single frame, the selection of the sub-flow being based on the respective value of the at least one parameter associated with each of the plurality of sub-flows, and each of the plurality of sub-flows corresponding to a different Internet Protocol (IP) address, and
  transmit the plurality of TCP acknowledgement messages in the single frame through the selected sub-flow in response to selecting the selected sub-flow, each of the plurality of TCP acknowledgement messages being in response to a different downlink data packet among a plurality of downlink data packets, and each of the plurality of downlink data packets being over a different sub-flow among the plurality of sub-flows.

11. The UE as claimed in claim 10, wherein each sub-flow in the plurality of sub-flows is based on a radio access technology, and the radio access technology is one of a cellular communication technology, a Wi-Fi Technology, or a short range communication technology.

12. The UE as claimed in claim 10, wherein the UE is one of:
- a Dual Receiver Dual Subscriber Identity Module (SIM) Dual Standby (DR-DSDS) device having a single transmitter and two receivers, and configured to support two SIMs,
- a Dual SIM Dual Active (DSDA) device having two transceivers and configured to support two SIMs,
- a Single SIM Dual Radio (SSDR) device, or
- a Single SIM Multiple Radio (SSMR) device.

13. The UE as claimed in claim 10, wherein the at least one processor is configured to execute the computer-readable instructions to establish a second sub-flow among the plurality of sub-flows upon satisfaction of at least one condition from a first set of conditions, the second sub-flow being established after a first sub-flow among the plurality of sub-flows has been established.

14. The UE as claimed in claim 13, wherein the first set of conditions comprises at least one of:
- receipt of a second sub-flow establishment input from an external source,
- a radio connection quality of the first sub-flow being below a defined threshold, or
- a charging policy of the second sub-flow having tariff lower than a tariff of a charging policy of the first sub-flow.

15. The UE as claimed in claim 13, wherein the at least one processor is configured to execute the computer-readable instructions to release the second sub-flow based on a second set of conditions, wherein the second set of conditions comprises at least one of:
- a radio connection quality of the second sub-flow being lower than a radio connection quality of the first sub-flow for a determined time period, or termination of an application accessing data services using the second sub-flow.

16. A non-transitory computer-readable medium storing instructions that, when executed by at least one processor of a User Equipment (UE), cause the at least one processor to perform a method, the method comprising:
determining a respective value of at least one parameter associated with each of a plurality of sub-flows of the UE, the at least one parameter being selected from among a set of parameters, the plurality of sub-flows being established according to Multipath Transmission Control Protocol (MPTCP), and the set of parameters including a radio connection quality associated with a respective sub-flow among the plurality of sub-flows, an Uplink Power Headroom (UPH) associated with the respective sub-flow and a charging policy of a carrier of the respective sub-flow;

selecting a sub-flow among the plurality of sub-flows for transmitting a plurality of TCP acknowledgement messages in a single frame, the selecting the sub-flow being based the respective value of the at least one parameter associated with each of the plurality of sub-flows, and each of the plurality of sub-flows corresponding to a different Internet Protocol (IP) address; and transmitting the plurality of TCP acknowledgement messages in the single frame through the selected sub-flow in response to the selecting, each of the plurality of TCP acknowledgement messages being in response to a different downlink data packet among a plurality of downlink data packets, and each of the plurality of downlink data packets being received over a different sub-flow among the plurality of sub-flows.

17. The non-transitory computer-readable medium as claimed in claim 16, wherein each sub-flow in the plurality of sub-flows is based on a radio access technology, and the radio access technology is one of a cellular communication technology, a Wi-Fi Technology, or a short range communication technology.

18. The non-transitory computer-readable medium as claimed in claim 16, wherein the UE is one of:

a Dual Receiver Dual Subscriber Identity Module (SIM) Dual Standby (DR-DSDS) device having a single transmitter and two receivers, and configured to support two SIMs, a Dual SIM Dual Active (DSDA) device having two transceivers and configured to support two SIMs, a Single SIM Dual Radio (SSDR) device, or a Single SIM Multiple Radio (SSMR) device.

19. The non-transitory computer-readable medium as claimed in claim 16, wherein the method further comprises:

establishing a second sub-flow among the plurality of sub-flows upon satisfaction of at least one condition from a first set of conditions, the establishing the second sub-flow being performed after a first sub-flow among the plurality of sub-flows has been established.

20. The non-transitory computer-readable medium as claimed in claim 19, wherein the first set of conditions comprises at least one of:

receipt of a second sub-flow establishment input from an external source, a radio connection quality of the first sub-flow being below a defined threshold, or a charging policy of the second sub-flow having tariff lower than a tariff of a charging policy of the first sub-flow.

\* \* \* \* \*